July 21, 1970
T. A. TRINTER
3,521,097
SYNCHRONOUS ELECTRIC MOTOR
Filed July 17, 1968
2 Sheets-Sheet 1
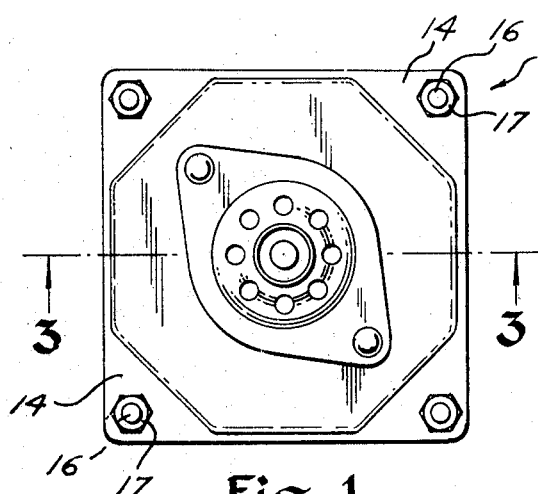
Fig. 1
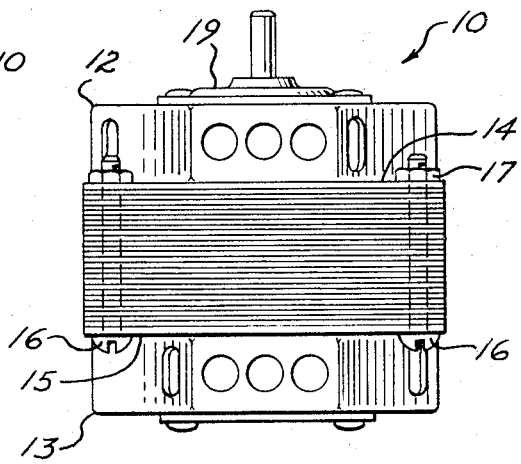
Fig. 2
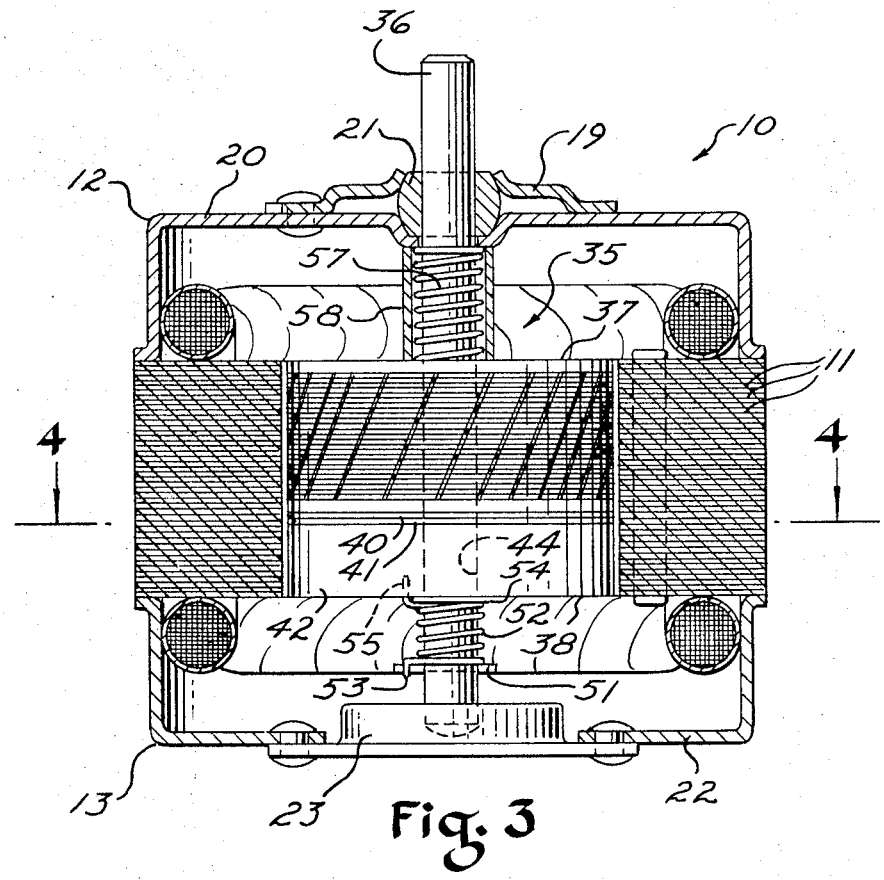
Fig. 3
INVENTOR
Timothy A. Trinter
BY J. H. SLOUGH
ATTORNEY July 21, 1970  T. A. TRINTER  3,521,097
SYNCHRONOUS ELECTRIC MOTOR
Filed July 17, 1968

INVENTOR
Timothy A. Trinter
BY
J. H. SLOUGH
ATTORNEY

United States Patent Office 3,521,097
Patented July 21, 1970

3,521,097
SYNCHRONOUS ELECTRIC MOTOR
Timothy A. Trinter, Vermilion, Ohio, assignor to The General Industries Company, Elyria, Ohio, a corporation of Ohio
Filed July 17, 1968, Ser. No. 745,583
Int. Cl. H02k *19/00*
U.S. Cl. 310—162     7 Claims

ABSTRACT OF THE DISCLOSURE

An electric motor has a nonsynchronous induction rotor section fixed upon a rotor shaft, there being a permanent magnet, synchronous rotor section rotatably mounted on the shaft adjacent to the induction rotor section. Washers of low friction material are provided between the rotor sections whereby the sections can rotate freely with respect to each other. The synchronous rotor section is connected to the rotor shaft by a spring which limits its rotation relative to the shaft and enables the nonsynchronous section to rotate ahead of the synchronous section from the stall position up to near-synchronous speed whereupon the synchronous section can rotatively pass the nonsynchronous section to pull it to synchronous speed.

---

This invention relates to electric motors and more particularly to a synchronous electric motor and an improved rotor therefor.

As herein disclosed, the motor of this invention comprises a combination rotor having synchronous and nonsynchronous rotor sections mounted upon a common shaft and disposed within a common stator and rotating field. The nonsynchronous rotor section comprises an ordinary induction rotor rigidly mounted upon the shaft for rotation therewith whereas the synchronous rotor section comprises permanent magnet means rotatably mounted upon the shaft and connected thereto by spring means which allows said section to rotate a limited amount with respect to the induction rotor section. The invention as herein disclosed is particularly adapted for driving phonograph turntables, tape recorders, tape players and the like.

An object of this invention is to provide a synchronous electric motor having improved starting torque and synchronous torque and which will quickly reach and maintain synchronous speed.

Another object of the invention is to provide a synchronous electric motor affording the torque characteristics of an induction motor for starting and overcoming loads applied thereto and having the synchronizing characteristics of a permanent magnet synchronous motor.

Still another object is to provide a synchronous electric motor as set forth above wherein the induction and synchronous rotor sections can act independently of each other to a limited degree.

Yet another object of the invention is to provide a synchronous electric motor of the above type wherein the synchronous rotor section which rotatively leads the other section resiliently pulls said other section into synchronism therewith.

Other objects of the invention and the invention itself will be readily apparent from the following description of the invention and the accompanying drawings, in which said drawings:

FIG. 1 is a top plan view of the electric motor of this invention;

FIG. 2 is a side elevation of the motor of FIG. 1;

FIG. 3 is an enlarged section taken along the line 3—3 of FIG. 1;

Figure 4:
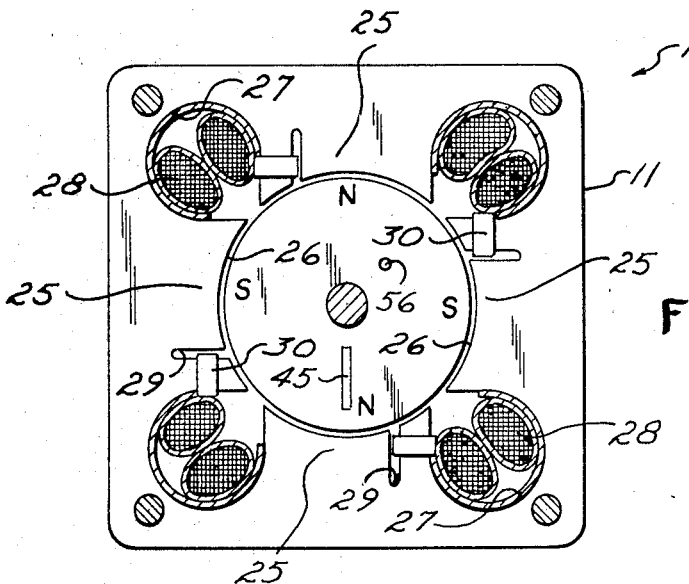
FIG. 4 is a transverse section, reduced in size relative to FIG. 3, taken along the line 4—4 of FIG. 3.
Figures 6, 7, 8:
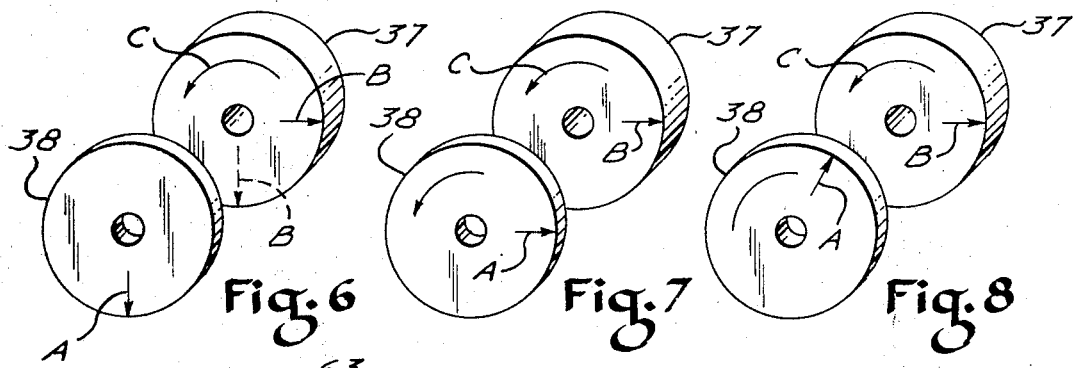
Figure 9:
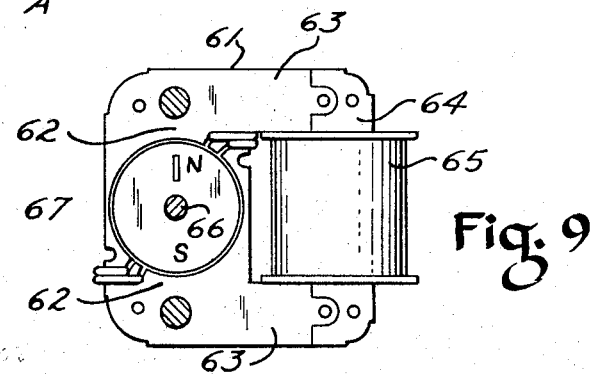

FIGS. 6, 7, and 8 are simplified, exploded views showing the relative positions of the rotor sections under different operating conditions of the motor; and FIG. 9 is a view of the type shown in FIG. 4 showing an embodiment of the present invention applied to a single coil, bipolar motor.

Referring now to the drawings in all of which like parts are designated by like reference numerals, the improved motor of this invention is generally indicated at 10 and comprises a multiplicity of stacked field laminations 11 disposed between a pair of end housing members, upper housing member 12 and lower housing member 13. The said housing members 12 and 13 are provided with horizontally projecting corner flanges 14 and 15, respectively, which overlie similarly formed corners of the field laminations 11. At each corner a bolt 16 projects upwardly through suitable aligned apertures in the field laminations 11 and the corner flanges 14 and 15 and is provided at its upper end with a threaded nut 17 whereby said laminations and end housing members are secured together in a well-known manner.

The upper end housing member 12 has an upper end wall 20 and bearing retainer 19 which carry a suitable upper bearing 21. The lower end housing member 13 is similarly provided with a lower end wall 22 which carries a thrust bearing 23 coaxially positioned with respect to the upper bearing 21.

As best seen in FIG. 4, the field laminations 11 are cut or stamped out to provide four stator poles 25 having inner, concavely rounded edges 26 providing an opening for receiving the rotor. The field laminations 11 are also provided with suitable openings 27 at the corners thereof for receiving stator coils 28. Each stator pole 25 is preferably provided with an inwardly opening slot 29 adjacent to one side of the pole for receiving a suitable shading ring 30 in a well-known manner.

Figure 5:
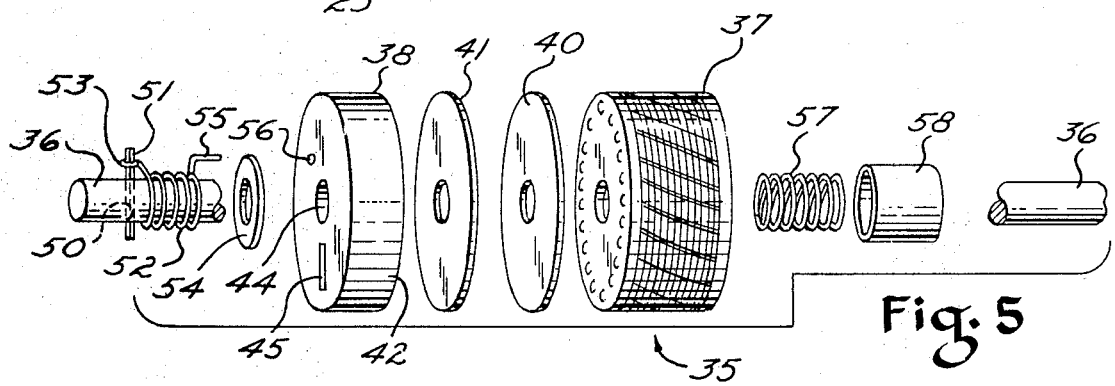
FIG. 5 is an exploded perspective view of the rotor and associated parts of the motor.

The rotor element for the motor of this invention is generally indicated at 35 in FIGS. 3 and 5 and comprises a shaft 36 having its lower end seated in the thrust bearing 23 and its upper end portion projecting upwardly through the upper bearing 21. The shaft 36 carries a nonsynchronous rotor section 37 in the form of an ordinary squirrel cage induction rotor rigidly mounted to rotate with said shaft. A synchronous rotor section 38 comprising permanent magnet means is disposed axially adjacent to the induction rotor section 37, both rotor sections being disposed substantially within the stator laminations 11.

The induction rotor section 37 has a washer 40 preferably cemented to the end thereof facing the synchronous rotor section 38, said synchronous rotor section being preferably provided with a like washer 41 cemented to the end thereof facing the induction rotor section. The washers 40 and 41 are preferably made of a low friction material such as nylon whereby the rotor sections have substantially friction-free contact with each other.

As herein illustrated, the synchronous rotor section 38 comprises a permanent magnet 42 having a central hole to provide a through bore 44 and provided with a groove or mark 45 to indicate its polarity. Said magnet is magnetized to provide diametrically opposite north poles as indicated by the mark 45 and diametrically opposite south poles disposed ninety degrees from the said mark (see FIG. 4). Thus the permanent magnet synchronous rotor section is provided with four alternating north and south poles corresponding to the four stator poles 25.

The lowermost end portion of the shaft 36 is provided with a diametric through bore 50 adapted to receive a pin 51 projected therethrough. A coil spring 52 is telescoped over the shaft 36 between the pin 51 and the synchronous rotor section 38, one end of said coil spring having a loop 53 which engages an outwardly projecting end portion of the pin 51. The opposite end of the coil spring 52 abuts a washer 54 disposed adjacent to the permanent magnet 42 and is provided with an axially projecting anchor portion 55 which projects into a suitable opening 56 in the permanent magnet 43. The synchronous rotor section 38 is pivotally mounted upon the shaft 36 and it will be readily seen that the same can rotate in either direction relative to said shaft within limits afforded by the coil spring 52.

At the opposite end of the shaft 36 (above the induction rotor section as illustrated in FIG. 3), said shaft is provided with a second coil spring 57 telescoped over said shaft and disposed between the induction rotor section 37 and the upper bearing 21. A tubular sleeve 58 is telescoped over the coil spring 57, said sleeve serving as a spacer to prevent excessive upper movement of the rotor and shaft.

In operation, the starting torque for the rotor 35 is provided by the induction rotor section 37. The synchronous rotor section 38 provides very low torque from the stall position and, therefore, the nonsynchronous or induction rotor section initially moves out ahead of the synchronous rotor section. This is illustrated in FIG. 6 wherein the solid line arrow A on the synchronous rotor section 38 and the dotted line arrow B on the nonsynchronous rotor section indicate points which are normally in axial alignment when the motor is de-energized. The energized condition is illustrated by the full line position of the arrow B indicating the manner in which the induction rotor section moves out ahead of the permanent magnet rotor when the motor is initially started and the rotor rotates in the direction indicated by the arrow C. This relative movement between the rotor sections creates a tension on the coil spring 52 which then tends to pull or drag the permanent magnet rotor section around with it.

The induction rotor section provides accelerating torque from the stall position to just below the desired synchronous speed. As synchronous speed is approached, the synchronous rotor section 38 catches up with the induction rotor section under the bias of the coil spring 52. This is illustrated in FIG. 7 where the arrows A and B are shown to be in substantial alignment. At this point, the synchronous rotor section's magnetized poles tend to follow and are urged to align with the poles as set up by the rotating field of the stator and thus pass the induction rotor section. This last condition is illustrated in FIG. 8 wherein the arrow A is shown to have moved rotatively ahead of the arrow B.

At synchronous speed all of the running torque is provided by the synchronous or permanent magnet rotor section which urges the induction rotor section 37, and therefore, the shaft 36 along with it. The spring 52 is adapted to limit the relative rotation between the rotor sections whereby when the synchronous rotor section pulls into synchronous speed, the induction rotor section and shaft are pulled up to synchronous speed also at a later moment due to the windup of the spring. The spring 52 preferably allows a maximum of 180° relative displacement in either circumferential direction between the rotor sections, although as illustrated in FIGS. 6–8, such displacement does not generally occur in use.

In starting from a stall position, the induction rotor section moves ahead of the synchronous rotor section, and as shown in FIG. 8, at synchronous speed the synchronous rotor section is ahead of the nonsynchronous rotor section an amount determined by the load torque imposed on the induction rotor. However, it can be readily seen that the coil spring 52 allows for substantially greater relative displacement if needed.

As hereinbefore described, the squirrel cage induction rotor 37 will bring the motor 10 up to near-synchronous speed. In a four pole motor of the type illustrated in FIGS. 1–4, the synchronous speed is 1800 r.p.m. at a supply frequency of 60 Hz. The induction rotor 37 will accelerate from the stall position to approximately 1725 r.p.m. at which point it is believed that the bias of the coil spring 52 and the urging to alignment of the permanent magnet poles with the rotating poles set up by the stator field causes the permanent magnet rotor section 38 to overshoot and pass up the induction rotor section thereby engaging the rotating field and attaining the synchronous speed. This causes the spring 52 to wind up and exert a tension on the shaft 36 thereby causing said shaft to turn at the desired synchronous speed. The induction rotor section although providing no forward torque at this point rotates at synchronous speed with the shaft 36 due to its rigid mounting thereon.

The principle of this invention can be applied to a synchronous electric motor having any desired number of stator poles. FIG. 9 illustrates, by way of example, a two-pole motor made up of field laminations 61 formed to provide two stator poles 62 having laterally projecting arms 63 connected together by laminations 64. A single coil 65 is carried by the laminations 64 to provide the necessary rotating field at the poles 62 in a well-known manner. In this embodiment a rotor shaft 66 carries a synchronous rotor section 67 made up of permanent magnet means having diametrically opposite north and south poles as indicated. It will be understood that such motor would have a nonsynchronous induction rotor section of the type shown at 37 in the first embodiment of the invention. The bipolar motor illustrated in FIG. 9 is adapted to have a synchronous speed of 3600 r.p.m. at a supply frequency of 60 Hz. with the induction rotor section accelerating the rotor to 3400 or 3500 r.p.m. at which point the synchronous rotor section 65 moves out ahead of the induction rotor section to cause the motor to attain synchronous speed.

From the foregoing it will be seen that the synchronous electric motor of this invention has both means for providing sufficient starting and accelerating torque and also means for quickly bringing the rotor element thereof into synchronous speed. The present invention provides both the advantages of an induction motor for starting and overcoming loads and that of a permanent magnet synchronous motor for bringing the same into synchronous speed. This is effected by providing means for relative rotative displacement between the induction rotor section and the permanent magnet rotor section in addition to resilient means for allowing the synchronous rotor section to move out ahead and engage the rotating field. No matter which of the sections leads the other section, said other section is resiliently pulled into synchronism therewith.

It will be understood that many changes in the details of the invention as herein described and illustrated may be made without, however, departing from the spirit thereof or the scope of the appended claims.

What I claim is:

1. An electric motor comprising a stator for producing a rotating flux about the motor axis; a shaft mounted for rotation about said axis; a high torque, nonsynchronous rotor section rigidly mounted upon said shaft and rotatable with said shaft within said stator; a low torque, synchronous rotor section rotatably mounted upon said shaft adjacent to said nonsynchronous section within said stator whereby said synchronous rotor section can move rotatively with respect to said nonsynchronous rotor section; resilient means connecting said synchronous section to said shaft and affording limited resilient rotative movement in either rotative direction relative to said nonsynchronous section whereby said nonsynchronous section rotates ahead of said synchronous section from the stall position to supply accelerating torque up to near-synchronous speed and whereby said synchronous rotor section then rotates on ahead of said nonsynchronous rotor section and attains synchronous speed, said resilient means pulling said shaft and nonsynchronous section into synchronous speed whereby said sections rotate together.

2. An electric motor comprising a stator for producing a rotating flux about the motor axis; a shaft mounted for rotation about said axis; a high torque, nonsynchronous rotor section mounted upon said shaft for rotation therewith within said stator; a low torque, synchronous rotor section rotatably mounted upon said shaft adjacent to said nonsynchronous section within said stator; resilient means connecting said synchronous section to said shaft and affording limited resilient rotative movement in either direction relative to said nonsynchronous section whereby said nonsynchronous section rotates ahead of said synchronous section from the stall position to supply accelerating torque up to near-synchronous speed and whereby said synchronous rotor section then rotates on ahead of said nonsynchronous rotor section and attains synchronous speed, said resilient means pulling said nonsynchronous section into synchronous speed whereby said sections rotate together, said resilient means limiting said relative rotative movement between said rotor sections to substantially 180° in either direction.

3. An electric motor as set forth in claim 1: said nonsynchronous rotor section comprising an induction rotor and said synchronous rotor section comprising oriented permanent magnet means.

4. An electric motor as set forth in claim 1: second resilient means biasing said rotor sections together; and low friction contact means disposed between said rotor sections whereby said sections can rotate relative to each other.

5. An electric motor comprising a stator for producing a rotating flux about the motor axis; a shaft mounted for rotation about said axis; a high torque, induction rotor section mounted upon said shaft for rotation therewith within said stator; a low torque, permanent magnet rotor section rotatably mounted upon said shaft adjacent to said induction rotor section and disposed within said stator; a coil spring telescoped over said shaft adjacent to said magnet rotor section; said coil spring having means at one end thereof engaging said magnet rotor section and means connecting the opposite end thereof to said shaft for rotation therewith and affording limited resilient rotative movement of said magnet rotor section in either direction relative to said induction rotor section, whereby upon energization of said stator, said induction rotor section provides starting torque and rotates ahead of said magnet rotor section from the stall position to near-synchronous speed and whereby said magnet rotor section is spring biased into synchronism with said induction rotor section and then rotates on ahead of said induction rotor section and attains synchronous speed, said spring then pulling said induction rotor section into synchronous speed.

6. An electric motor as set forth in claim 5: a second coil spring telescoped over said shaft adjacent to said induction rotor section and biasing said rotor sections into contact with each other; low friction means disposed between said rotor sections to afford substantially friction-free contact between said rotor sections.

7. An electric motor as set forth in claim 6: said means connecting the opposite end of said first mentioned coil spring to said shaft comprising a pin projecting radially outwardly from said shaft; said first mentioned coil spring having a loop formed at its opposite end telescoped over said pin.

References Cited

UNITED STATES PATENTS

| | | | |
|---|---|---|---|
| 2,487,688 | 11/1949 | Bishofberger | 310—112 |
| 3,171,049 | 2/1965 | Jarret | 310—114 |
| 3,173,042 | 3/1965 | Fodor | 310—114 |
| 3,209,185 | 9/1965 | Draper | 310—156 |

MILTON O. HIRSHFIELD, Primary Examiner

R. SKUDY, Assistant Examiner

U.S. Cl. X.R.

310—114, 156